United States Patent [19]

Viaud et al.

[11] Patent Number: 5,070,780
[45] Date of Patent: Dec. 10, 1991

[54] ROCK SHIELD BRIDGING THE NIP FORMED BETWEEN THE BALE CHAMBER BELTS AND A DRIVEN ROLL SUPPORTING THE BELTS

[75] Inventors: Jean Viaud, Sarrequemines; Arsene Roth, Walschbronn, both of France; Henry D. Anstey, Ottumwa, Iowa; Ernest Pfrimmer, Rouhling, France

[73] Assignee: Deere & Company, Del.

[21] Appl. No.: 524,618

[22] Filed: May 17, 1990

[30] Foreign Application Priority Data

Jun. 28, 1989 [GB] United Kingdom ................ 8914809

[51] Int. Cl.⁵ .............................................. B30B 5/06
[52] U.S. Cl. ...................................... 100/88; 56/341
[58] Field of Search ............... 100/5, 87, 88, 173–175; 56/1, 341, 342, 343, DIG. 24

[56] References Cited

U.S. PATENT DOCUMENTS

| | | | |
|---|---|---|---|
| 2,975,700 | 3/1961 | Stroburg et al. | 100/174 X |
| 3,125,948 | 3/1964 | Redding | 100/88 |
| 3,837,159 | 9/1974 | Vermeer | 100/88 X |
| 4,288,969 | 9/1981 | Underhill | 56/10.2 X |
| 4,428,282 | 1/1984 | Anstey | 100/88 |
| 4,436,027 | 3/1984 | Freimuth et al. | 100/88 |
| 4,444,098 | 4/1984 | Soteropulos | 100/88 |
| 4,581,879 | 4/1986 | Anstey | 100/88 X |
| 4,633,659 | 1/1987 | Anstey et al. | 100/88 X |
| 4,648,239 | 3/1987 | Geiser et al. | 100/88 X |
| 4,782,652 | 11/1988 | White | 100/88 X |

FOREIGN PATENT DOCUMENTS

| | | | |
|---|---|---|---|
| 0152085 | 8/1985 | European Pat. Off. | 100/88 |
| 2575362 | 7/1986 | France | 100/88 |

*Primary Examiner*—Harvey C. Hornsby
*Assistant Examiner*—Stephen F. Gerrity

[57] ABSTRACT

The baling chamber of one type of round baler is defined by belts which are trained over rolls connected to a drive. Stones can enter the nip formed between the belts and some of the rolls, e.g., a lower front belt driving roll, and thereby cause poor tracking of the belts. To reduce the problem, a shield device is snap-fit mounted on the roll. The device includes a nip bridging plate an upright portion of which abuts the belt run advancing to the nip and a downwardly sloping lower portion of which bridges the nip. Thus the device covers the nip preventing access to it by the stones, and stones which fall upon it slide down the sloping portion of the plate eventually to find their way harmlessly to the ground.

12 Claims, 4 Drawing Sheets

ROCK SHIELD BRIDGING THE NIP FORMED BETWEEN THE BALE CHAMBER BELTS AND A DRIVEN ROLL SUPPORTING THE BELTS

BACKGROUND OF THE INVENTION

This invention relates to a machine for forming cylindrical bales of crop.

Machines, towed by a tractor, for forming large cylindrical bales of hay (so-called "round balers") are well known. As the machine advances, the crop is removed from a windrow by a pick-up mechanism and delivered rearwardly to a baling chamber where it is rolled round upon itself into a bale.

In one form of such a machine the baling chamber is defined by runs of side-by-side belts which move outwardly to enlarge the chamber so as to accomodate the bale as it grows in size. The belts are trained over rolls connected to a drive. A pair of rolls is sited at the top of chamber and these rolls are carried by a swingable tension arm on either side of the machine enabling the two rolls to swing upwardly as the girth of the bale increases. Foreign bodies, particularly stones, can find their way between the belts and their associated rolls and then become trapped causing the belts to deviate from their required path over the rolls. As the baling chamber grows in size with the bale being formed, the angle of the belts trained over a roll will change, and this makes the problem more difficult to solve. One roll particularly exposed to stones which can cause poor belt tracking is that located at the lower forward part of the baling chamber, i.e. the lower front belt driving roll which is vulnerable both to stones falling onto it after passing through gaps between neighboring belts and to stones thrown up by a crop pick-up which is disposed immediately under it in the type of machine which is fed from the underside.

The invention reduces the tendency of stones and other foreign bodies to be trapped between belts and an associated roll in a round baler.

SUMMARY OF THE INVENTION

According to the present invention, there is provided an improved machine for forming cylindrical bales of crop and, more particularly, there is provided a machine having a baling chamber defined by belts supported by rolls over which the belts can move to roll the crop into a bale and including a device for preventing foreign bodies from entering the nip formed between the belts and the rolls.

An object or feature of the invention is to provide a shield device mounted so as to bridge the nip between the roll and associated belts and prevent the ingress of foreign bodies into the nip.

A more specific object is to provide a shield device comprising a support at either end of the roll disposed outwardly of the belts and a nip bridging plate attached between the supports.

These and other objects will become apparent from a reading of the ensuing description together with the appended drawings.

DESCRIPTION OF THE PREFERRED EMBODIMENT

Figure 1:
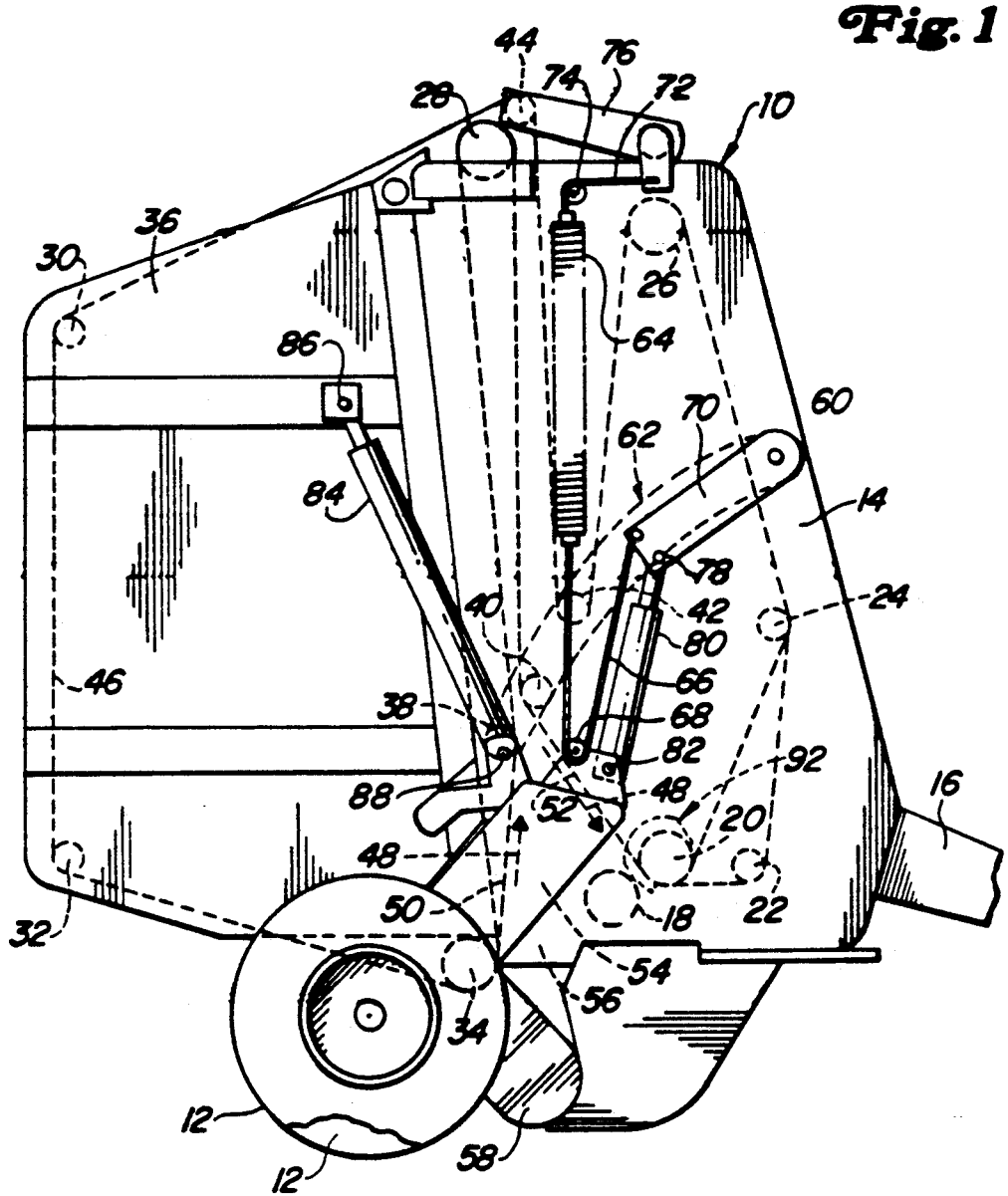
FIG. 1 is a view from the right side of a machine for forming large cylindrical bales of hay showing the configuration of rolls and their associated belts.

In FIG. 1, the baler includes a main frame 10 mounted on a pair of wheels 12. The main frame has an upright fore-and-aft extending wall 14 on either side connected by transverse beams (not shown). A draft tongue 16 is connected to a transverse beam at the front of the frame 10 and extends forwardly for attaching the baler to a tractor (also not shown) which draws the machine.

A pluralility of lateral rolls extend over the width of the machine. One set of rolls 18, 20, 22, 24, 26, 28 is journalled in the side walls 14, while another set consisting of rolls 30, 32, 34 is journalled in a swingable gate 36. There are also a pair of chamber restricting rolls 38, 40 and two belt take-up rolls 42, 44.

Six rubber belts 46 are trained side-by-side over the rolls, with the exception of the roll 18 which acts as a stripper roll, to provide the configuration shown and they move in the direction indicated by arrows 48, the stripper roll 18 being driven anti-clockwise as viewed in FIG. 1. However, alternate belts only are trained over the lower foremost roll 22, while the remaining belts by-pass this roll, to provide a staggered array which is described in U.S. Pat. No. 4,399,746 granted Aug. 23, 1983. Upwardly extending runs 50, 52 of the belts 46 define a bale-forming chamber 54 the ends of which are provided by the side walls 14 and gate 36 and which has an inlet 56 for crop received from a pick-up 58 beneath it.

In order to accommodate the increasing diameter of a growing bale core in the bale-forming chamber 54, the size of the chamber must also increase and a belt take-up and tensioning mechanism is provided at either side of the machine. These mechanisms include: a pair of rearwardly extending tension arms which are mounted rigidly at the forward end of the main frame 10 on a horizontal transverse shaft 60, providing a pivot connection for the arms, and of which the right hand arm 62 only is shown; the belt take-up roll 42 which is supported at either end at an intermediate location on the arms 62; and the pair of chamber restricting rolls 38, 40 supported at the free ends of the arms. The arms are biased in an anti-clockwise direction (in FIG. 1) by a pair of springs, one on either side of the main frame 10, of which only the right hand spring 64 is shown and only its arrangement will be described, the other being similar. The spring 64 is connected at its lower end by a cable 66 which runs over a pulley 68 to a lever portion 70 of the arm 62, the portion 70 being rigid with the pivot shaft 60, and at its upper end by a cable 72 via a pulley 74 to one arm of a bell crank 76 the other arm of which bears one end of the take-up roll 44. The free end of the lever portion 70 is pivotally connected at a point 78 to the piston rod of a piston and cylinder unit 80, loading the arm 62, of which the cylinder is in turn pivotally connected to the frame 10 at a point 82, a similar arrangement being provided also on the left hand side of the machine.

A further piston and cylinder unit 84 (on either side of the machine) is connected between pivot points 86, 88 on the gate 36 and main frame 10 for opening and closing the gate.

In operation, crop lying in a windrow is lifted and conveyed to the baling chamber 54 where the oppositely moving runs 50, 52 of the belts 46, aided by the stripper roll 18, cause the crop to turn clockwise (as viewed in FIG. 1) to form a bale core of increasing size which eventually overcomes the tension in the belts 46 brought about by the tensioning mechanisms, and the two tensioning arms (e.g. arm 62) swing upwardly and thus the chamber 54 increases in size to accomodate as necessary the bale core as its diameter grows.

Figure 2:
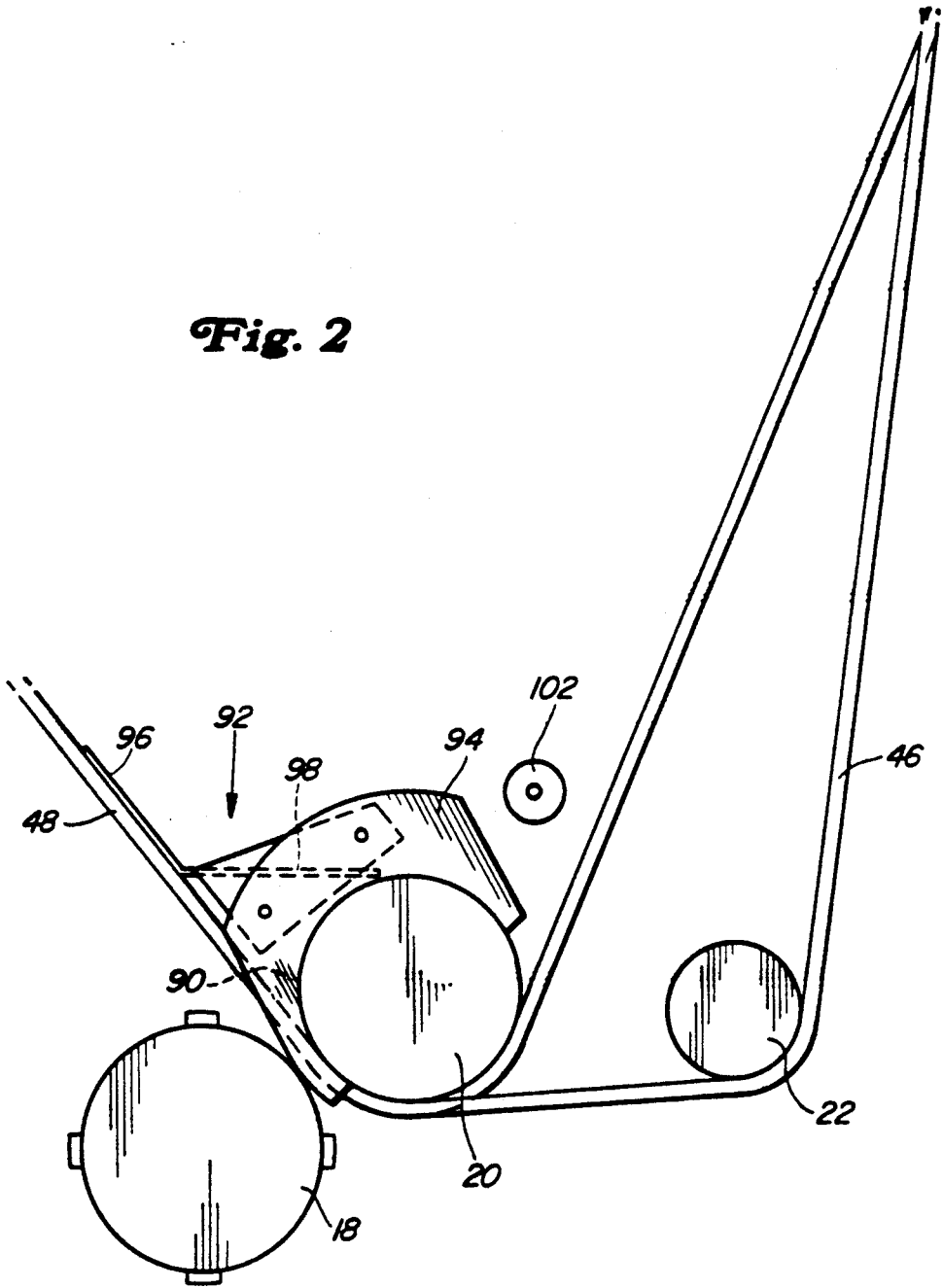
FIG. 2 shows, in end view, a lower front belt driving roll and its shield device against stones at the start of baling.
Figure 3:
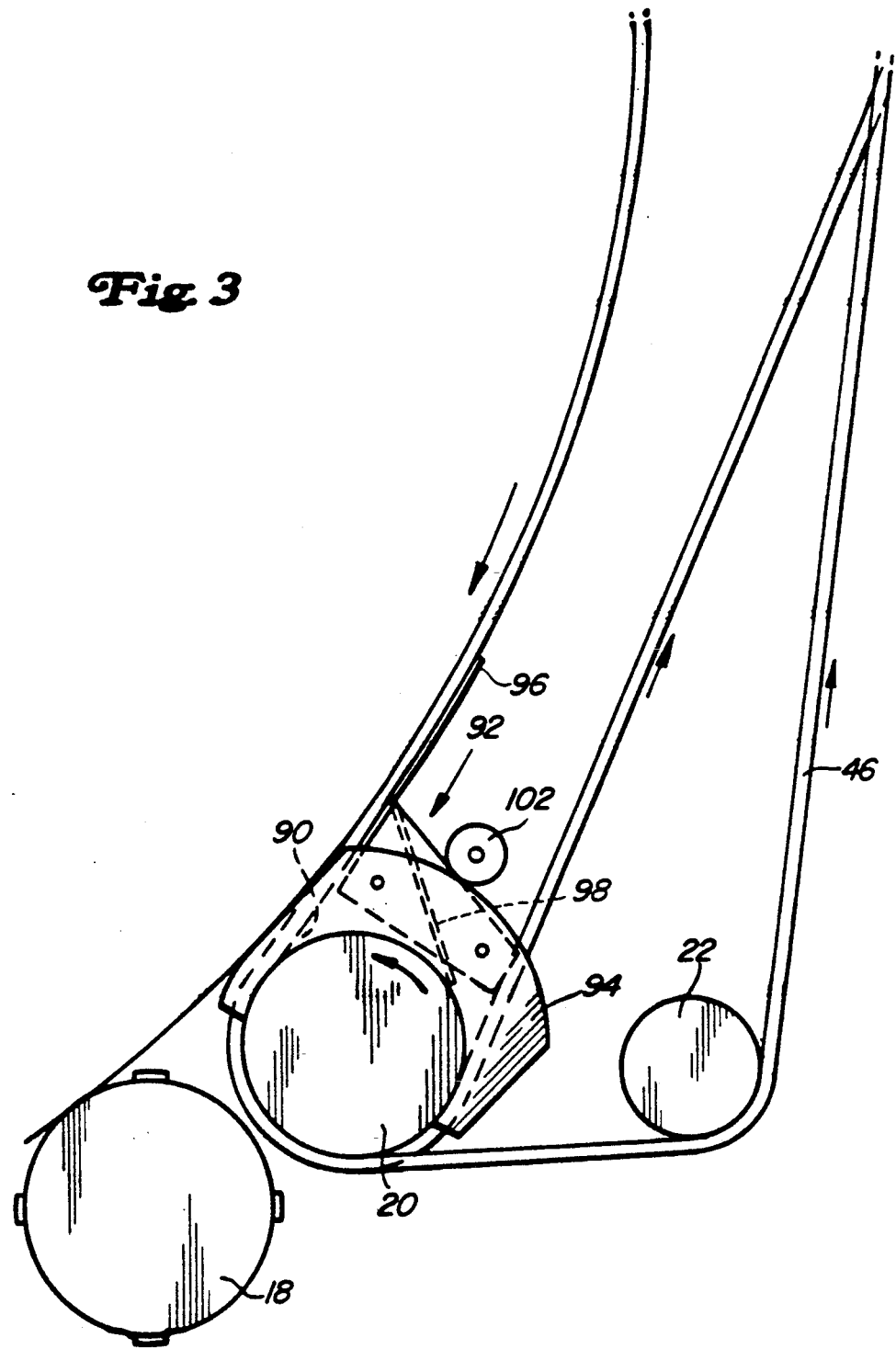
FIG. 3 is a similar view to FIG. 2 but at almost the completion of baling.

During this process the entrainment angle of the belts 46 over some of the rolls changes as can be seen, for example, when comparing the line taken by the belts at the start in FIG. 2 over the roll 20 which is the lower front belt driving roll with the line they take toward the end of baling in FIG. 3 where they hug the roll 20 more completely.

The roll 20 is particularly exposed to stones or other foreign bodies which may be picked up with the crop and fall through the gaps between the belts 46 onto it or even may be thrown up from the ground by the pick-up 58 and then fall against it. In both instances, the stones can sometimes move with the roll surface into nip 90 formed between the belt run 48 and the roll 20. The nip 90 changes, of course, as baling progresses. If the stones become sandwiched between the belts 46 and the roll 20 they can cause the belts to be diverted from their normal path round the roll, and this poor tracking can result in the belts 46 fouling other parts of the machine and in other problems.

Figure 4:
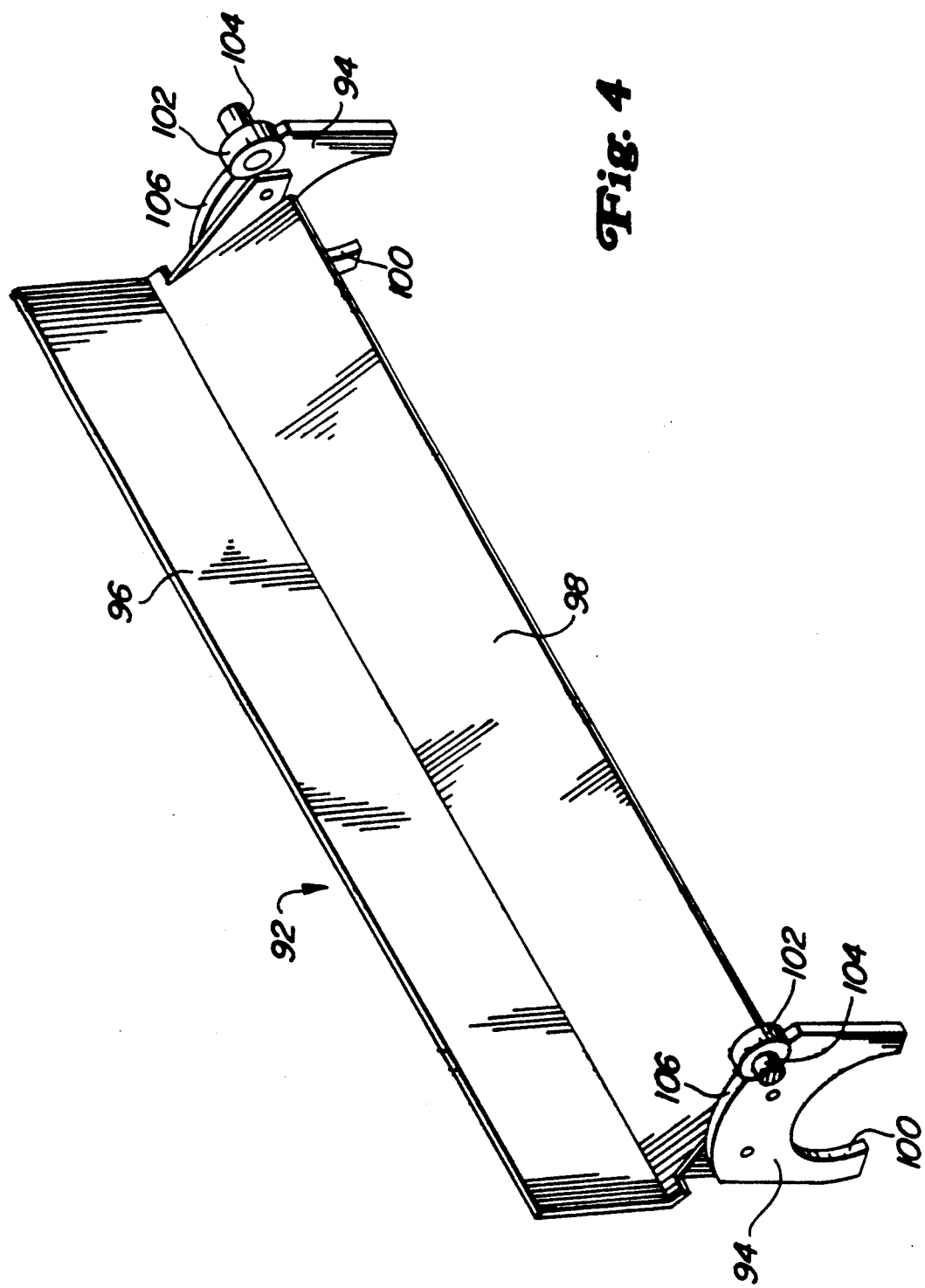
FIG. 4 is a perspective of the shield device in FIGS. 2 and 3.

In order to reduce these difficulties, a shield device 92 (FIG. 4) is provided to bridge the changing nip 90 against ingress of the stones into the nip. The device 92 has a support plate 94, which is preferably made of a low friction, wear resistant material such as plastic or oiled wood at either end and a nip bridging plate which consists of an upper upright portion 96 and a lower portion 98 angled thereto and which is bolted between the support plates 94. The support plates 94 are aligned in the fore-and-aft direction of the machine and the bridging plate is transverse thereto. The support plates 94 contain substantially semi-circular notches and are mounted directly on the roll 20 at either end thereof outwardly of the belts 46 and the notches including riding surfaces 100 that ride on the roll. The riding surfaces 100 of the plates 94 encompass slightly more than half the circumference of the roll 20 and thus extend somewhat beyond the diameter of the cross section of the roll so that they can be snap fitted on it. The portion 96 then will lie in abutting contact with the surface of the belt run 48 advancing to the nip 90 while the portion 98 will bridge the nip 90. This is the natural position of the shield device 92 which it will tend to maintain due to the rotation of the roll 20. To ensure that the support plates 94 do not become detached from the roll 20 they are also each held on the roll by a cam in the form of a bearing 102 on a shaft 104 mounted on the side walls 14. The bearing 102 is positioned for contact with, and may be spring loaded into contact with, a radiused guide upper surface 106 of the associated plate 94, the guide surface being coaxial with the roll 20.

It will readily be seen from FIGS. 2 and 3 that the shield device 92 constantly accomodates the changing nip 90 because the belt run 48 pushes the shield device clockwise, as the bale chamber 54 expands, against the tendency of the rotating roll 20 to carry the shield device 92 with it in an anti-clockwise direction.

It will also be noticed from FIGS. 2 and 3 that the lower portion 98 of the nip bridging plate offers a forward running downhill slope to any stone appproaching the nip 90, whether at the beginning of baling when the slope is slight or at the end when the slope is significant. Thus, any stone will slide down the portion 98 to the forward side of the roll 20 where it can find its way harmlessly between the belts 46 to drop to the ground.

We claim:

1. In a machine for forming cylindrical bales of crop having a baling chamber defined in part by a plurality of belts supported in side-by-side relationship to each other by a plurality of rolls with which the belts form nips as the belts move thereover, the improvement comprising: a shield device including a support at either end of said one of said plurality of rolls and disposed outwardly of the belts; and a nip bridging plate attached between the supports so as to bridge the nip between said one of the rolls and the associated belts and prevent the ingress of foreign bodies into the nip.

2. A machine according to claim 1 in which the supports are mounted directly on the roll to ride on it, the roll being rotatable with respect to the supports, so that the plate tends to be maintained in contact with the belt by the rotating roll.

3. A machine according to claim 2 in which the riding surfaces of the supports engage slightly more than half the circumference of the cross section of the roll so that they can be mounted thereon by snap fitting.

4. A machine according to claim 3 in which the supports are low friction wear resistant plates.

5. A machine according to any of claim 2 in which each support has a radiused guide surface outward of the roll which surface is coaxial with the roll, and a cam is mounted on the associated side of the machine to bear against the guide surface so as to maintain the support on the roll.

6. A machine according to claim 1 in which the nip bridging plate has one portion having a surface which contacts the belt surface advancing to the nip and another portion angled thereto which bridges the nip.

7. A shield device for fitment to a machine having a plurality of belts supported side-by-side of a plurality of rolls in an arrangement defining a baling chamber for forming cylindrical bales of crop, the device comprising: parallel, transversely spaced ends shaped for being snap fit on one of the belt support rolls of the machine; a plate interconnecting said ends and being adapted for bridging a nip formed between the support roll and the belts supported thereby.

8. In a large round baler including a bale chamber formed by a plurality of belts supported side-by-side on a plurality of rolls arranged for defining an inlet at a bottom of the chamber with one of the rolls bounding a forward part of the inlet and defining a nip with the belts passing thereover, the improvement comprising: a shield means extending substantially the entire length of said one of the rolls and being mounted in bridging relationship to said nip and including a pair of end supports releasably secured to said one of the rolls.

9. The large round baler defined in claim 8 wherein the pair of end supports each comprise an upright plate having a substantially semicircular notch therein received on said one of the rolls.

10. The large round baler defined in claim 9 wherein the notch of each of said end supports encompasses slightly more than half the circumference of said one of the rolls; and said end supports being deflectable for permitting them to be snap fit onto said one of the rolls.

11. The large round baler defined in claim 8 wherein the plurality of belts are engaged with a lower portion of said one of the rolls, with the belts, as viewed from a right hand side of the baler considered while facing in a forward direction of travel, travelling counterclockwise with the periphery of said one of the rolls; and said shield means including a shield member extending between said end supports and including a first portion engaging a side of said belts opposite the chamber and a second portion joining said first portion and extending to and in general tangent relationship to said one of the rolls.

12. The large round baler defined in claim 8 wherein a cam member is mounted in juxtaposition to said end supports for preventing the latter from becoming removed from said one of the rolls.

* * * * *